UNITED STATES PATENT OFFICE.

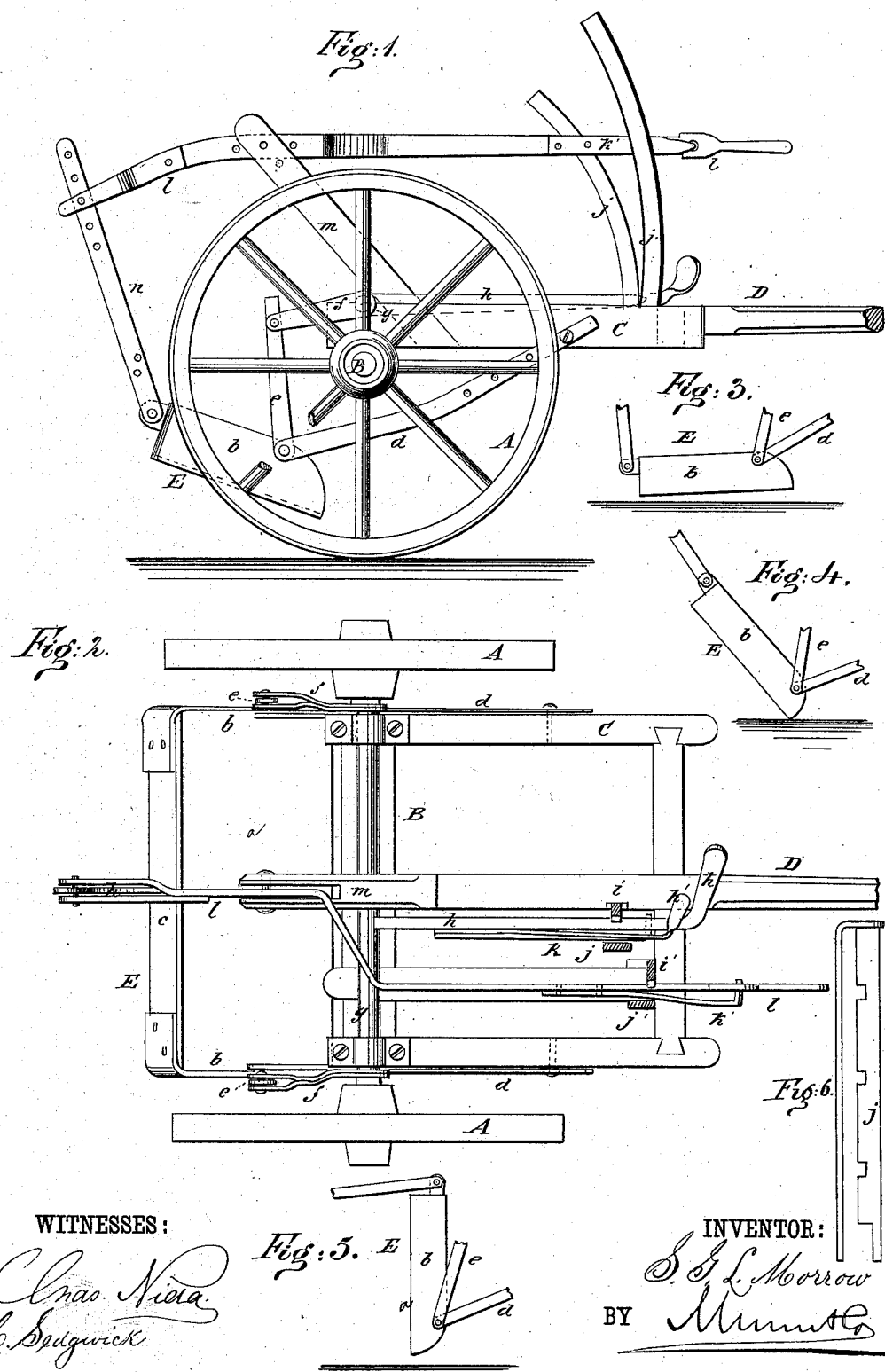

SILAS G. L. MORROW, OF NEW BLOOMFIELD, MISSOURI.

IMPROVEMENT IN ROAD-SCRAPERS.

Specification forming part of Letters Patent No. 205,290, dated June 25, 1878; application filed April 10, 1878.

*To all whom it may concern:*

Be it known that I, SILAS GREEN LEE MORROW, of New Bloomfield, in the county of Callaway and State of Missouri, have invented a new and Improved Road-Scraper, of which the following is a specification:

Figure 1 is a side elevation of my improved road-scraper. Fig. 2 is a plan view. Figs. 3, 4, and 5 are detail views showing the scraper in various positions. Fig. 6 is a detail front view of one of the notched bars for locking the levers.

Similar letters of reference indicate corresponding parts.

My invention relates to scrapers for leveling roads, making excavations, and other similar operations; and it consists essentially in a cart having attached to it a scraper, which is suspended and operated by levers attached to the cart.

In the drawing, A A are wheels placed on the axle B, which is secured to the frame C. A tongue, D, is secured to the frame C, and connected with the axle.

A scraper, E, which is of rectangular box form, having a bottom, $a$, and three sides, $b\ b\ c$, is connected with the frame C by means of bars $d$, by which it is kept at a uniform distance behind the axle.

The forward side of the scraper is suspended by links $e$ from arms $f$, that project rearwardly from the rock-shaft $g$, which is journaled in boxes on the frame C, and is provided with an operating-lever, $h$, which extends forward between two parallel curved bars, $i\ j$, secured to the frame C, near the front.

The bar $i$ is notched and the lever is beveled, to engage the notches, and is provided with a spring, $k$, that bears against the curved bar $j$ and presses the lever into engagement with the notched bar.

The lever $h$ is bent to receive the foot, and is provided with an arm, $h'$, which gives the operator an additional advantage in depressing the lever.

A lever, $l$, is fulcrumed in an inclined standard, $m$, that projects upward from the frame C, and its shorter end is connected with the rear side of the scraper by the bar $n$, and the longer end extends forward between two curved bars, $i'\ j'$, attached to the frame C.

The curved bar $i'$ is notched, as in the other case, and the lever $l$ is provided with a spring, $k'$, which throws it into engagement with the notched curved bar $i'$.

The lever $l$, standard $m$, bar $n$, and the draw-bars $d$ are provided with several holes to vary the adjustment of the levers and scraper.

By means of the levers $h\ l$ the scraper E may be placed at any desired height or arranged at any required angle for scraping, excavating, and carrying earth, &c., as indicated in the several figures in the drawing. The scraper may also be rigidly locked in any of its positions by means of the levers $h\ l$.

My improved scraper has many advantages over scrapers of ordinary construction, among which are portability, ease of management, and adaptability to various kinds of work.

I do not limit myself to the precise details of construction as herein described, as they may be varied without departing from my invention.

Having thus described my invention, I claim as new and desire to secure by Letters Patent—

1. The combination of the draw-bars $d$, operating-levers $l\ h$, connecting-bars $n\ e$, and arms $f$ with the scraper E and the supporting-truck, as and for the purpose set forth.

2. The combination of the lever $h$, rock-shaft $g$, having arms $f$, and the suspending-links $e$ with the wheel-supported scraper E, substantially as herein shown and described.

3. The combination of the adjustable lever $l$ and bar $n$ with the scraper E, substantially as herein shown and described.

SILAS GREEN LEE MORROW.

Witnesses:
S. M. FERGUSON,
JOHN K. PEMBERTON.